(12) United States Patent
Huang et al.

(10) Patent No.: US 10,962,504 B2
(45) Date of Patent: Mar. 30, 2021

(54) METHOD FOR COMPRESSING AND RECONSTRUCTING DATA

(71) Applicants: Hubei University of Technology, Wuhan (CN); Tsinghua University, Beijing (CN); China Special Equipment Inspection and Research Institute, Beijing (CN); Eddysun (Xiamen) Electronic Co., Ltd., Xiamen (CN); Huazhong University of Science and Technology, Wuhan (CN)

(72) Inventors: Songling Huang, Beijing (CN); Xiaochun Song, Wuhan (CN); Gongtian Shen, Beijing (CN); Wei Zhao, Beijing (CN); Junming Lin, Xiamen (CN); Yihua Kang, Wuhan (CN); Yu Zhang, Beijing (CN); Shen Wang, Beijing (CN)

(73) Assignees: HUBEI UNIVERSITY OF TECHNOLOGY, Wuhan (CN); TSINGHUA UNIVERSITY, Beijing (CN); CHINA SPECIAL EQUIPMENT INSPECTION AND RESEARCH INSTITUTE, Beijing (CN); EDDYSUN (XIAMEN) ELECTRONIC CO., LTD., Xiamen (CN); HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 381 days.

(21) Appl. No.: 15/829,586

(22) Filed: Dec. 1, 2017

(65) Prior Publication Data
US 2018/0164253 A1 Jun. 14, 2018

(30) Foreign Application Priority Data
Dec. 8, 2016 (CN) .......................... 201611121562.7

(51) Int. Cl.
*G01N 29/06* (2006.01)
*G01N 29/44* (2006.01)
(Continued)

(52) U.S. Cl.
CPC ..... *G01N 29/0672* (2013.01); *G01N 29/2412* (2013.01); *G01N 29/42* (2013.01);
(Continued)

(58) Field of Classification Search
CPC ..... G01N 2291/023; G01N 2291/0289; G01N 2291/0427; G01N 2291/106;
(Continued)

(56) References Cited

U.S. PATENT DOCUMENTS 5,629,485 A * 5/1997 Rose .................... B64D 15/20
                                                73/170.26
8,863,044 B1 * 10/2014 Casati ................ G06F 17/5072
                                                716/106
(Continued)

FOREIGN PATENT DOCUMENTS

CN            103020909 B  *  2/2015

OTHER PUBLICATIONS

"Ideological Sublations: Resolution of Dialectic in Population-based Optimization", by Hosseini et al. (Year: 2017).*
(Continued)

*Primary Examiner* — Roy Y Yi
*Assistant Examiner* — Geoffrey T Evans
(74) *Attorney, Agent, or Firm* — Hodgson Russ LLP (57) ABSTRACT

Disclosed are a method and device for compressing and reconstructing data. The method includes: disposing a transmitting EMAT array and a receiving EMAT array; exciting a Lamb wave, receiving the Lamb wave, subjecting the Lamb wave to narrowband filtering with the narrowband frequency, to form detecting data x(n); analysing the detect-
(Continued)

ing data with a DFT; reconstructing original detecting data and calculating a reconstruction error according to the measurement vector and the recovery matrix by using a TLBO algorithm; optimizing measurement vector and recovery matrix; transmitting the measurement vector to a supervisory device.

15 Claims, 3 Drawing Sheets

(51) Int. Cl.
  *G01N 29/42* (2006.01)
  *G01N 29/24* (2006.01)
  *G01N 29/46* (2006.01)
(52) U.S. Cl.
  CPC ......... *G01N 29/44* (2013.01); *G01N 29/4427* (2013.01); *G01N 29/4481* (2013.01); *G01N 29/46* (2013.01); *G01N 2291/023* (2013.01); *G01N 2291/0289* (2013.01); *G01N 2291/0427* (2013.01); *G01N 2291/106* (2013.01)
(58) Field of Classification Search
  CPC ........... G01N 29/0672; G01N 29/2412; G01N 29/42; G01N 29/4427; G01N 29/4481; G01N 29/46; G01N 29/44
  See application file for complete search history.

(56) References Cited

U.S. PATENT DOCUMENTS

| 2012/0103097 | A1* | 5/2012 | Lopez Jauregui ............................ G01N 29/2412 73/643 |
| 2014/0063314 | A1* | 3/2014 | Sankaranarayanan ....................... H04N 5/23293 348/333.02 |
| 2018/0073860 | A1* | 3/2018 | Leitner .................. H04N 5/335 |

OTHER PUBLICATIONS

English machine translation of patent document, CN103020909B, by Sun et al. (Year: 2015).*
Front matter and sections 2.2 and 2.3 of "Teaching Learning Based Optimization Algorithm"; Rao, R. Venkata (Year: 2015).*
WorldCat entry, retrieved Apr. 2, 2020, for "Teaching Learning Based Optimization Algorithm"; Rao, R. Venkata; ebook version; ISBN: 9783319227320 (Year: 2020).*
Wang et al., "Method Research of Compressive Sensing in Structural Health Monitoring Based on Lamb Wave," Instrument Technique and Sensor, Oct. 2016, No. 10, pp. 123-126.
SIPO, First Office Action for CN Application No. 201611121562.7, dated Oct. 12, 2018.

* cited by examiner

METHOD FOR COMPRESSING AND RECONSTRUCTING DATA

CROSS-REFERENCE TO RELATED APPLICATION

This application claims priority to and benefits of Chinese Patent Application Serial No. 201611121562.7, filed with the State Intellectual Property Office of P. R. China on Dec. 8, 2016, the entire content of which is incorporated herein by reference.

FIELD

The present disclosure relates to the field of nondestructive testing, and more particularly to a method for compressing and reconstructing data.

BACKGROUND

Specific information of contour and size of a defect can be quicly and effectively obtained by a Lamb wave tomography. In order to achieve high-quality tomography of a large-area plate, dozens of electromagnetic acoustic transducers (EMATs) may be used, in which a transmitting EMAT may correspond to a receiving EMAT, such that hundreds of groups of data may be detected and each frame of wave needs to repeat Lamb wave transmitting and receiving steps multiple times for noise reduction processing. Therefore, Lamb wave detecting data generated by one single imaging may be in a huge amount, for example, if it is assumed that 500 kB detecting data is contained in each frame of wave, the size of data for one single imaging may be up to 5 GB or more. In a process of scanning and imaging a large area plate, in order to ensure a certain scanning speed, a single imaging usually needs to be completed within a dozen of seconds, such that the host device needs to transmit a large amount of detecting data to a supervisory device within the specified time period. However, due to limitations of interface transmission speeds of current mainstream data acquisition equipment and the supervisory device, the actual data transmission speed between the host device and the supervisory device is usually lower than 50 MB/s, such that transmission of the above large amount of detecting data completed by the device may be more than 102 s, which cannot meet the time requirement of one single imaging.

The Lamb wave tomography and real-time imaging of a defect are limited by above problems. Currently, a method for compressing and reconstructing data detected by the Lamb wave is still needed. Developing a fast, large-scale and high-quality method for compressing and reconstructing data detected by electromagnetic ultrasonic Lamb wave has a significant influence on development of the real-time Lamb wave tomography.

SUMMARY

Embodiments of the present disclosure seek to solve at least one of the problems existing in the related art to at least some extent.

An object of the present disclosure is to provide a method for compressing and reconstructing data, so as to solve low efficiency problem caused by huge size of data and a long time transmission generated by imaging of a large-area plate.

According to a first aspect of the present disclosure, a method for compressing and reconstructing data is provided. The method includes:

disposing a transmitting electromagnetic acoustic transducer (EMAT) array and a receiving EMAT array at two sides of a detecting region of a material to be detected respectively;

exciting a Lamb wave in a desired mode with a narrowband frequency $f_c$ by each EMAT in the transmitting EMAT array in a predetermined order, receiving the Lamb wave by the receiving EMAT array, subjecting the Lamb wave to narrowband filtering with the narrowband frequency $f_c$, to form detecting data $x(n)$, in which n=1, 2, ... N, N is a positive integer;

analysing the detecting data with a discrete Fourier transformation (DFT) to obtain a sparse representation of original detecting data and a sparsity K thereof, determining an initial value of a low dimensional measurement number M according to the sparsity K and a length N of the original detecting data, in which K and M are positive integers;

measuring the detecting data $x(n)$ with a Gaussian random matrix $\Phi$ to obtain a measurement vector $y(m)$, in which a dimension of the Gaussian random matrix $\Phi$ is M×N, a dimension of the measurement vector is M, and M<<N, and obtaining a recovery matrix A;

reconstructing a vector of original detecting data and calculating a reconstruction error according to the measurement vector and the recovery matrix by using a teaching-learning based optimization (TLBO) algorithm;

determining whether the reconstruction error is smaller than a first predetermined value, completing the reconstruction, extracting a current measurement vector $y(m)$ in a low dimension and sending the current measurement vector $y(m)$ to a supervisory device if the reconstruction error is smaller than the first predetermined value;

determining whether the number of times of iteration is greater than a second predetermined value if the reconstruction error is not smaller than a predetermined value, if yes, completing the reconstruction, extracting a current measurement vector $y(m)$ in a low dimension and sending the current measurement vector $y(m)$ to a supervisory device, if no, increasing the measurement number M by 1 and returning to the step of measuring an original data vector $x(n)$ with a Gaussian random matrix $\Phi$ to obtain a measurement vector $y(m)$.

According to a second aspect of the present disclosure, a device for compressing and reconstructing data is provided. The device includes a processor, and a memory for storing instructions executable by the processor, in which the processor is configured to perform the method for compressing and reconstructing data according to the first aspect of the present disclosure.

According to a third aspect of the present disclosure, a non-transitory computer-readable storage medium is provided having stored therein instructions that, when executed by a processor of a mobile terminal, causes the mobile terminal to perform a method for compressing and reconstructing data according to the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

According to a first aspect of the present disclosure, a method for compressing and reconstructing data is provided. The method includes:

disposing a transmitting electromagnetic acoustic transducer (EMAT) array and a receiving EMAT array at two sides of a detecting region of a material to be detected respectively;

exciting a Lamb wave in a desired mode with a narrowband frequency $f_c$ by each EMAT in the transmitting EMAT array in a predetermined order, receiving the Lamb wave by the receiving EMAT array, subjecting the Lamb wave to narrowband filtering with the narrowband frequency $f_c$, to form detecting data x(n), in which n=1, 2, . . . N, N is a positive integer;

analysing the detecting data with a discrete Fourier transformation (DFT) to obtain a sparse representation of original detecting data and a sparsity K thereof, determining an initial value of a low dimensional measurement number M according to the sparsity K and a length N of the original detecting data, in which K and M are positive integers;

measuring the detecting data x(n) with a Gaussian random matrix $\Phi$ to obtain a measurement vector y(m), in which a dimension of the Gaussian random matrix $\Phi$ is M×N, a dimension of the measurement vector is M, and M<<N, and obtaining a recovery matrix A;

reconstructing a vector of original detecting data and calculating a reconstruction error according to the measurement vector and the recovery matrix by using a teaching-learning based optimization (TLBO) algorithm;

determining whether the reconstruction error is smaller than a first predetermined value, completing the reconstruction, extracting a current measurement vector y(m) in a low dimension and sending the current measurement vector y(m) to a supervisory device if the reconstruction error is smaller than the first predetermined value;

determining whether the number of times of iteration is greater than a second predetermined value if the reconstruction error is not smaller than a predetermined value, if yes, completing the reconstruction, extracting a current measurement vector y(m) in a low dimension and sending the current measurement vector y(m) to a supervisory device, if no, increasing the measurement number M by 1 and returning to the step of measuring an original data vector x(n) with a Gaussian random matrix $\Phi$ to obtain a measurement vector y(m).

In an embodiment of the present disclosure, the EMAT array is a circular meander coil, exciting a Lamb wave in a desired mode with a narrowband frequency $f_c$ by each EMAT in the transmitting EMAT array in a predetermined order, receiving the Lamb wave by the receiving EMAT array, subjecting the Lamb wave to a narrowband filtering with the narrowband frequency $f_c$, to form detecting data x(n) includes:

exciting and receiving the narrowband Lamb wave in the desired mode according to a matching relationship between a working frequency and a wire pitch;

subjecting the Lamb wave to the narrowband filtering with a high-order narrowband filter circuit to obtain the detecting data x(n).

In an embodiment of the present disclosure, analysing the detecting data with a discrete Fourier transformation (DFT) to obtain a sparse representation of original detecting data and a sparsity K includes:

analysing the detecting data with the DFT of $$S(k) = \sum_{n=0}^{N-1} x(n) e^{-j\frac{2\pi kn}{N}},$$

where x(n) is the detecting data, in which n=1, 2, . . . N, N is a positive integer, e is the base of natural logarithm, j is the imaginary unit, $\pi$ is the ratio of the circumference, k is a variable of angle counts;

obtaining the sparse representation of the original detecting data and the sparsity K thereof by using a transformation matrix of $$x = \Psi s$$

where $\Psi$ is an orthogonal basis of the DFT with a dimension of N×N, s is an sparse representation of original data x in a frequency domain with a dimension of N and a sparsity of K.

In an embodiment of the present disclosure, determining an initial value of a low dimensional measurement number M according to the sparsity K and a length N of the original detecting data includes:

determining the initial value of low dimensional measurement number M according to the sparsity K and the length N of the original detecting data with a formula of $$M = \text{Floor}\left(\min\left\{K, K \log \frac{N}{K}\right\}\right)$$

where min is a function for determining a minimum value, Floor is an integer acquiring function to acquire an integer closest to the negative infinity.

In an embodiment of the present disclosure, measuring the detecting data x(n) with a Gaussian random matrix $\Phi$ to obtain a measurement vector y(m), in which a dimension of the Gaussian random matrix Φ is M×N, a dimension of the measurement vector is M, and M<<N, and obtaining a recovery matrix A includes:

measuring an original data vector x(n) with a Gaussian random matrix Φ to obtain a measurement vector y(m) with a formula of $$y=\Phi x=\Phi\Psi s=As;$$

obtaining a recovery matrix A with a formula of $$A=\Phi\Psi$$

where a dimension of the recovery matrix A is M×N, and M<<N.

In an embodiment of the present disclosure, reconstructing a vector of original detecting data and calculating a reconstruction error according to the measurement vector and the recovery matrix by using a teaching-learning based optimization (TLBO) algorithm includes:

using the TLBO to calculate a vector Si with an underdetermined equation of $$y=As_1,$$

obtaining reconstruction data $x_1$ by using the DFT with a formula of $$x_1=\Psi s_1;$$

calculating the reconstruction error E with a formula of $$E = \frac{Norm(x_1 - x)}{Norm(x)}$$

where Norm is a function for calculating a 2-norm of a vector.

According to a second aspect of the present disclosure, a device for compressing and reconstructing data is provided. The device includes a processor, and a memory for storing instructions executable by the processor, in which the processor is configured to perform the method for compressing and reconstructing data according to the first aspect of the present disclosure.

According to a third aspect of the present disclosure, a non-transitory computer-readable storage medium is provided having stored therein instructions that, when executed by a processor of a mobile terminal, causes the mobile terminal to perform a method for compressing and reconstructing data according to the first aspect of the present disclosure.

With the method for compressing and reconstructing data according to an embodiment of the present disclosure, after a sparse characteristic of the narrowband electromagnetic ultrasonic Lamb wave detecting data is carefully analysed, the detecting data is processed with the DFT to obtain the sparse representation and to determine the initial value of the low dimensional measurement number. The detecting data is measured with the Gaussian random matrix according to the low dimensional measurement number to obtain the measurement vector. The original detecting data is reconstructed according to the measurement vector and the recovery matrix by using the TLBO algorithm. The iteration relationship between the reconstruction error and the measurement number is built, and the measurement vector and the recovery matrix are optimized, after that, the measurement vector is transmitted to the supervisory device. Thus, the detecting data is compressed with a high compression ratio and reconstructed with a high accuracy, for example, the compression ratio is more than 10% and the construction error is less than 10%, thus reducing the data transmission time.

The method for compressing and reconstructing data according to an embodiment of the present disclosure has advantages of high accuracy, high efficiency and great transmission speed, which solves low efficiency problem caused by huge size of data and a long time transmission generated by imaging of a large-area plate, thus achieving fast, large-scale, and high-quality data compression and transmission. Based on the advantages described above, such a method has a broad application prospect, for example, the real-time Lamb wave tomography may be significantly improved according to the method provided in embodiments of the present disclosure.

Embodiment 1

In this embodiment, the method for compressing and reconstructing data according to an embodiment of the present disclosure includes following steps.

At step 1: a steel plate to be detected has a thickness of 5 mm, a transmitting EMAT array (including 12 transmitting EMATs) and a receiving EMAT array (including 12 receiving EMATs) are disposed at two sides of the steel plate, and a diameter of the EMAT is 40 mm At step 2: a radio frequency power amplifier is used to excite each EMAT in the transmitting EMAT array to generate a Lamb wave and the Lamb wave is received by the receiving EMAT array, in which an excitation frequency is 125 kHz. The received Lamb wave is subjected to narrowband filtering by a four-order narrowband filter circuit with a filter center frequency of 125 kHz. A frame of the detecting data of the narrowband Lamb wave is taken as x(n), in which n=1, 2, ... N, N is 2000 in this embodiment.

At step 3: the detecting data x(n) is analysed with a discrete Fourier transformation (DFT) of:

$$S(k) = \sum_{n=0}^{N-1} x(n)e^{-j\frac{2\pi k n}{N}}.$$

The sparse representation of the original detecting data and the sparsity K thereof are obtained by using a transformation matrix of $$x=\Psi s$$

where Ψ is an orthogonal basis of the DFT with a dimension of N×N, a sparsity K of a vector s is 142.

Afterwards, an initial value of a low dimensional measurement number M is determined according to the sparsity K and the length N of the original detecting data with a formula of $$M = \text{Floor}\left(\min\left(K, K\log\frac{N}{K}\right)\right)$$

where min is a function for determining a minimum value, Floor is an integer acquiring function to acquire an integer closest to the negative infinity.

The initial value of the measurement number M in this embodiment is 142.

At step 4: the detecting data x(n) is measured with a Gaussian random matrix Φ to obtain a measurement vector y(m) with a following formula of $$y=\Phi x=\Phi\Psi s=As,$$

in which a dimension of the Gaussian random matrix Φ is M×N, a dimension of the measurement vector is M, and M<<N.

A recovery matrix A is obtained with a formula of $$A=\Phi\Psi.$$

At step 5: a vector $x_1$ of the original detecting data is reconstructed according to the measurement vector and the recovery matrix by using a teaching-learning based optimization (TLBO) algorithm in following formulas of:

$$y=As_1,$$

$$x_1=\Psi s_1.$$

The reconstruction error E is calculated with a formula of $$E = \frac{Norm(x_1 - x)}{Norm(x)}$$

where Norm is a function for calculating a 2-norm of a vector.

At step 6: it is determined whether the reconstruction error is smaller than 8%. If the reconstruction error is smaller than 8%, step 7 is performed, otherwise, it is determined whether the number of times of iteration is greater than 50. If yes, step 7 is performed, if no, the measurement number M is increased by 1 and step 4 is performed.

At step 7: the reconstruction is completed, a current measurement vector y(m) in a low dimension is extracted and sent to a supervisory device to be stored and processed.

Figure 2:
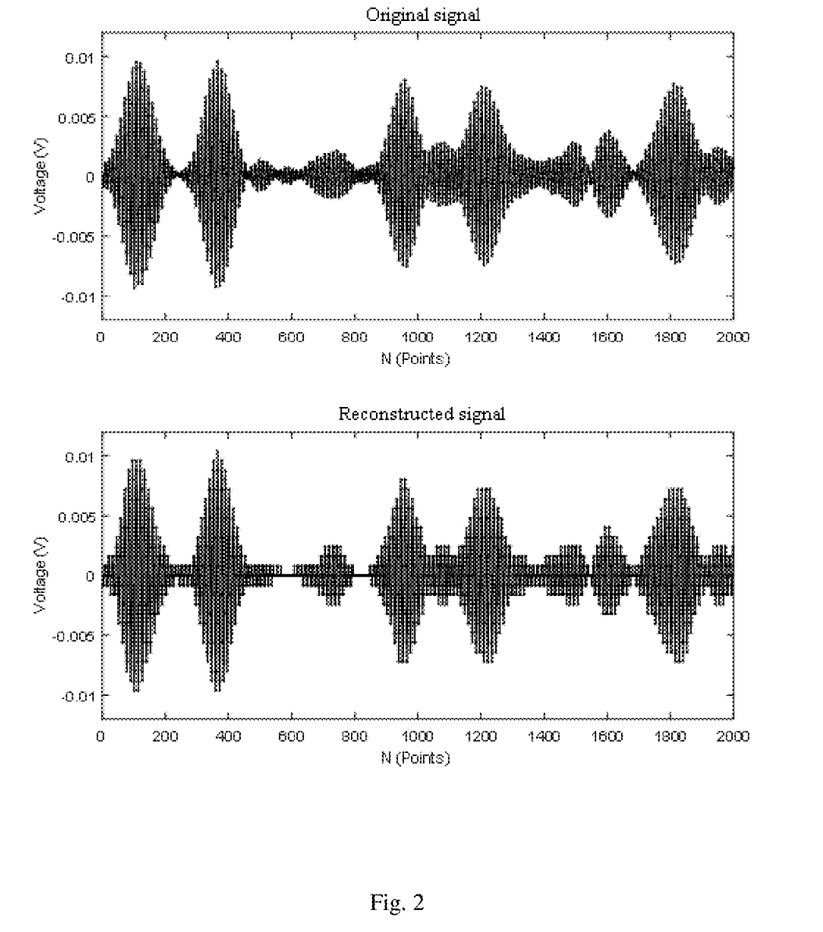
FIG. 2 is a schematic diagram showing reconstruction of the narrowband Lamb wave detecting data according to an embodiment of the present disclosure (2000 points)

The reconstruction error in this embodiment is 7.6%, the measurement number is 167, a compression ratio is 12. The construction result is shown in FIG. 2.

Embodiment 2

In this embodiment, the method for compressing and reconstructing data according to an embodiment of the present disclosure includes following steps.

At step 1: an aluminium plate to be detected has a thickness of 3 mm, a transmitting EMAT array (including 14 transmitting EMATs) and a receiving EMAT array (including 14 receiving EMATs) are disposed at two sides of the aluminium plate, and a diameter of the EMAT is 50 mm. At step 2: a radio frequency power amplifier is used to excite each EMAT in the transmitting EMAT array to generate a Lamb wave and the Lamb wave is received by the receiving EMAT array, in which an excitation frequency is 80 kHz. The received Lamb wave is subjected to narrowband filtering by a four-order narrowband filter circuit with a filter center frequency of 80 kHz. A frame of the detecting data of the narrowband Lamb wave is taken as x(n), in which n=1, 2, ... N, N is 600 in this embodiment.

At step 3: the detecting data x(n) is analysed with a discrete Fourier transformation (DFT) of:

$$S(k) = \sum_{n=0}^{N-1} x(n)e^{-j\frac{2\pi kn}{N}}.$$

The sparse representation of the original detecting data and the sparsity K thereof are obtained by using a transformation matrix of $$x=\Psi s$$

where Ψ is an orthogonal basis of the DFT with a dimension of N×N, a sparsity K of a vector s is 62.

Afterwards, an initial value of a low dimensional measurement number M is determined according to the sparsity K and the length N of the original detecting data with a formula of $$M = \text{Floor}\left(\min\left(K, K\log\frac{N}{K}\right)\right)$$

where min is a function for determining a minimum value, Floor is an integer acquiring function to acquire an integer closest to the negative infinity.

The initial value of the measurement number M in this embodiment is 61.

At step 4: the detecting data x(n) is measured with a Gaussian random matrix Φ to obtain a measurement vector y(m) with a following formula of $$y=\Phi x=\Phi\Psi s=As,$$

in which a dimension of the Gaussian random matrix Φ is M×N, a dimension of the measurement vector is M, and M<<N.

A recovery matrix A is obtained with a formula of $$A=\Phi\Psi.$$

At step 5: a vector $x_1$ of the original detecting data is reconstructed according to the measurement vector and the recovery matrix by using a teaching-learning based optimization (TLBO) algorithm in following formulas of:

$$y=As_1,$$

$$x=\Psi s_1.$$

The reconstruction error E is calculated with a formula of $$E = \frac{Norm(x_1 - x)}{Norm(x)}$$

where Norm is a function for calculating a 2-norm of a vector.

At step 6: it is determined whether the reconstruction error is smaller than 7%. If the reconstruction error is smaller than 7%, step 7 is performed, otherwise, it is determined whether the number of times of iteration is greater than 60. If yes, step 7 is performed, if no, the measurement number M is increased by 1 and step 4 is performed.

At step 7: the reconstruction is completed, a current measurement vector y(m) in a low dimension is extracted and sent to a supervisory device to be stored and processed.

The reconstruction error in this embodiment is 6.8%, the measurement number is 63, a compression ratio is 9.2. The construction result is shown in FIG. 3.

Figure 3:
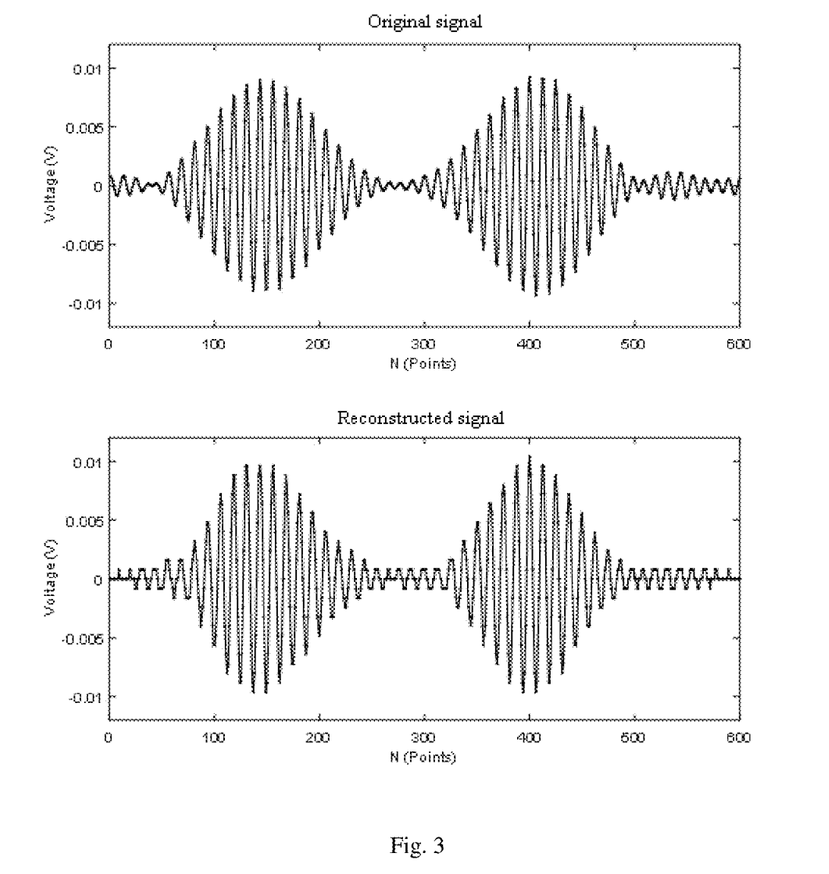
FIG. 3 is a schematic diagram showing reconstruction of the narrowband Lamb wave detecting data according to an embodiment of the present disclosure (600 points).

Each reconstructed signal in FIG. 2 and FIG. 3 has a high consistency with the original Lamb wave signal in contour, amplitude and appearance time, thus including enough accurate information of the original signal even at a great compression ratio.

According to an embodiment of the present disclosure, a device for compressing and reconstructing data is provided. The device includes a processor, and a memory for storing instructions executable by the processor, in which the processor is configured to perform the method for compressing and reconstructing data according to the abovementioned embodiments of the present disclosure.

According to an embodiment of the present disclosure, a non-transitory computer-readable storage medium is provided having stored therein instructions that, when executed by a processor of a mobile terminal, causes the mobile terminal to perform a method for compressing and reconstructing data according to the abovementioned embodiments of the present disclosure.

Figure 1:
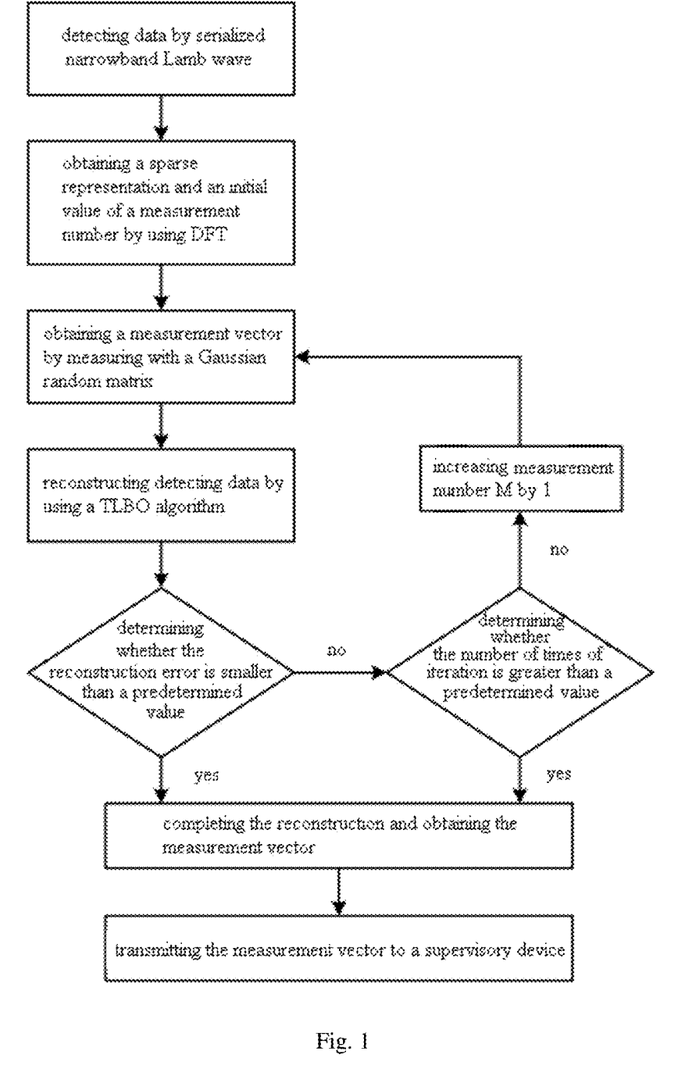
FIG. 1 is a flow chart of a method for compressing and reconstructing data according to an embodiment of the present disclosure.

It will be understood that, the flow chart or any process or method described herein in other manners may represent a module, segment, or portion of code that includes one or more executable instructions to implement the specified logic function(s) or that includes one or more executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flow chart may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure. Also, the flow chart is relatively self-explanatory and is understood by those skilled in the art to the extent that software and/or hardware can be created by one with ordinary skill in the art to carry out the various logical functions as described herein.

The logic and step described in the flow chart or in other manners, for example, a scheduling list of an executable instruction to implement the specified logic function(s), it can be embodied in any computer-readable medium for use by or in connection with an instruction execution system such as, for example, a processor in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the printer registrar for use by or in connection with the instruction execution system. The computer readable medium can include any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the device, system, and method of the present disclosure is embodied in software or code executed by general purpose hardware as discussed above, as an alternative the device, system, and method may also be embodied in dedicated hardware or a combination of software/general purpose hardware and dedicated hardware. If embodied in dedicated hardware, the device or system can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

It can be understood that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be, but is not limited to, read-only memories, magnetic disks, or optical disks.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for compressing and reconstructing data, comprising:
    disposing a transmitting electromagnetic acoustic transducer (EMAT) array and a receiving EMAT array at two sides of a detecting region of a material to be detected respectively;
    exciting a Lamb wave in a desired mode with a narrowband frequency $f_c$ of 125 kHz or 80 kHz by each EMAT in the transmitting EMAT array in a predetermined order, receiving the Lamb wave by the receiving EMAT array, subjecting the Lamb wave to narrowband filtering with the narrowband frequency $f_c$, to form detecting data x(n), in which n=1, 2, . . . N, N is a positive integer;
    analysing the detecting data with a discrete Fourier transformation (DFT) to obtain a sparse representation of original detecting data and a sparsity K thereof, determining an initial value of a low dimensional measurement number M according to the sparsity K and a length N of the original detecting data, in which K and M are positive integers;

multiplying the detecting data x(n) with a Gaussian random matrix Φ to obtain a measurement vector y(m), wherein a dimension of the Gaussian random matrix Φ is M×N, a dimension of the measurement vector is M, and M<<N, and obtaining a recovery matrix A;

reconstructing a vector of original detecting data and calculating a reconstruction error according to the measurement vector and the recovery matrix by using a teaching-learning based optimization (TLBO) algorithm;

determining whether the reconstruction error is smaller than a first predetermined value, completing the reconstruction, extracting a current measurement vector y(m) in a low dimension and sending the current measurement vector y(m) to a supervisory device if the reconstruction error is smaller than the first predetermined value;

determining whether the number of times of iteration is greater than a second predetermined value if the reconstruction error is not smaller than a predetermined value, if yes, completing the reconstruction, extracting a current measurement vector y(m) in a low dimension and sending the current measurement vector y(m) to a supervisory device, if no, increasing the measurement number M by 1 and returning to the step of measuring an original data vector x(n) with a Gaussian random matrix Φ to obtain a measurement vector y(m).

2. The method according to claim 1, wherein the EMAT array is a circular meander coil, exciting a Lamb wave in a desired mode with a narrowband frequency $f_c$ of 125 kHz or 80 kHz by each EMAT in the transmitting EMAT array in a predetermined order, receiving the Lamb wave by the receiving EMAT array, subjecting the Lamb wave to a narrowband filtering with the narrowband frequency $f_c$, to form detecting data x(n) comprises:

exciting and receiving the narrowband Lamb wave in the desired mode according to a matching relationship between a working frequency and a wire pitch;

subjecting the Lamb wave to the narrowband filtering with a high-order narrowband filter circuit to obtain the detecting data x(n).

3. The method according to claim 1, wherein analysing the detecting data with a discrete Fourier transformation (DFT) to obtain a sparse representation of original detecting data and a sparsity K comprises:

analysing the detecting data with the DFT of $$S(k) = \sum_{n=0}^{N-1} x(n) e^{-j\frac{2\pi k n}{N}},$$

where x(n) is the detecting data, in which n=1, 2, . . . N, N is a positive integer, e is the base of natural logarithm, j is the imaginary unit, π is the ratio of the circumference, k is a variable of angle counts;

obtaining the sparse representation of the original detecting data and the sparsity K thereof by using a transformation matrix of $x = \Psi s$ where Ψ is an orthogonal basis of the DFT with a dimension of N×N, s is an sparse representation of original data x in a frequency domain with a dimension of N and a sparsity of K.

4. The method according to claim 3, wherein determining an initial value of a low dimensional measurement number M according to the sparsity K and a length N of the original detecting data comprises:

determining the initial value of low dimensional measurement number M according to the sparsity K and the length N of the original detecting data with a formula of $$M = \text{Floor}\left(\min\left\{K, K\log\frac{N}{K}\right\}\right)$$

where min is a function for determining a minimum value, Floor is an integer acquiring function to acquire an integer closest to the negative infinity.

5. The method according to claim 4, wherein multiplying the detecting data x(n) with a Gaussian random matrix Φ to obtain a measurement vector y(m), wherein a dimension of the Gaussian random matrix Φ is M×N, a dimension of the measurement vector is M, and M<<N, and obtaining a recovery matrix A comprises:

measuring an original data vector x(n) with a Gaussian random matrix 1 to obtain a measurement vector y(m) with a formula of $y = \Phi x = \Phi \Psi s = As;$ obtaining a recovery matrix A with a formula of $A = \Phi \Psi$ where a dimension of the recovery matrix A is M×N, and M<<N.

6. The method according to claim 1, wherein reconstructing a vector of original detecting data and calculating a reconstruction error according to the measurement vector and the recovery matrix by using a teaching-learning based optimization (TLBO) algorithm comprises:

using the TLBO to calculate a vector $s_1$ with an underdetermined equation of $y = As_1,$ obtaining reconstruction data $x_1$ by using the DFT with a formula of $x = \Psi s_1;$ calculating the reconstruction error E with a formula of $$E = \frac{\text{Norm}(x_1 - x)}{\text{Norm}(x)}$$

where Norm is a function for calculating a 2-norm of a vector.

7. The method according to claim 1, wherein reconstructing a vector of original detecting data and calculating a reconstruction error according to the measurement vector and the recovery matrix by using a teaching-learning based optimization (TLBO) algorithm comprises:

using the TLBO to calculate a vector $s_1$ with an underdetermined equation of $y = As_1,$ obtaining reconstruction data $x_1$ by using the DFT with a formula of $$x_1 = \Psi s_1;$$

calculating the reconstruction error E with a formula of $$E = \frac{Norm(x_1 - x)}{Norm(x)}$$

where Norm is a function for calculating a 2-norm of a vector.

8. A device for compressing and reconstructing data, comprising:

a processor; and a memory for storing instructions executable by the processor;

wherein the processor is configured to perform a method for compressing and reconstructing data, the method comprising:

disposing an electromagnetic acoustic transducer (EMAT) transmitting array and an receiving EMAT array at two sides of a detecting region of a material to be detected respectively;

exciting a Lamb wave in a desired mode with a narrowband frequency $f_c$ of 125 kHz or 80 kHz by each EMAT in the transmitting EMAT array in a predetermined order, receiving the Lamb wave by the receiving EMAT array, subjecting the Lamb wave to narrowband filtering with the narrowband frequency $f_c$, to form detecting data x(n), in which n=1, 2, ... N, N is a positive integer;

analysing the detecting data with a discrete Fourier transformation (DFT) to obtain a sparse representation of original detecting data and a sparsity K thereof, determining an initial value of a low dimensional measurement number M according to the sparsity K and a length N of the original detecting data, in which K and M are positive integers;

multiplying the detecting data x(n) with a Gaussian random matrix Φ to obtain a measurement vector y(m), wherein a dimension of the Gaussian random matrix Φ is M×N, a dimension of the measurement vector is M, and M<<N, and obtaining a recovery matrix A;

reconstructing a vector of original detecting data and calculating a reconstruction error according to the measurement vector and the recovery matrix by using a teaching-learning based optimization (TLBO) algorithm;

determining whether the reconstruction error is smaller than a first predetermined value, completing the reconstruction, extracting a current measurement vector y(m) in a low dimension and sending the current measurement vector y(m) to a supervisory device if the reconstruction error is smaller than the first predetermined value;

determining whether the number of times of iteration is greater than a second predetermined value if the reconstruction error is not smaller than a predetermined value, if yes, completing the reconstruction, extracting a current measurement vector y(m) in a low dimension and sending the current measurement vector y(m) to a supervisory device, if no, increasing the measurement number M by 1 and returning to the step of measuring an original data vector x(n) with a Gaussian random matrix Φ to obtain a measurement vector y(m).

9. The device according to claim 8, wherein the EMAT array is a circular meander coil, exciting a Lamb wave in a desired mode with a narrowband frequency $f_c$ of 125 kHz or 80 kHz by each EMAT in the transmitting EMAT array in a predetermined order, receiving the Lamb wave by the receiving EMAT array, subjecting the Lamb wave to a narrowband filtering with the narrowband frequency fc, to form detecting data x(n) comprises:

exciting and receiving the narrowband Lamb wave in the desired mode according to a matching relationship between a working frequency and a wire pitch;

subjecting the Lamb wave to the narrowband filtering with a high-order narrowband filter circuit to obtain the detecting data x(n).

10. The device according to claim 8, wherein analysing the detecting data with a discrete Fourier transformation (DFT) to obtain a sparse representation of original detecting data and a sparsity K comprises:

analysing the detecting data with the DFT of $$S(k) = \sum_{n=0}^{N-1} x(n) e^{-j\frac{2\pi k n}{N}},$$

where x(n) is the detecting data, in which n=1, 2, ... N, N is a positive integer, e is the base of natural logarithm, j is the imaginary unit, π is the ratio of the circumference, k is a variable of angle counts;

obtaining the sparse representation of the original detecting data and the sparsity K thereof by using a transformation matrix of $$x = \Psi s$$

where Ψ is an orthogonal basis of the DFT with a dimension of N×N, s is an sparse representation of original data x in a frequency domain with a dimension of N and a sparsity of K.

11. The device according to claim 10, wherein determining an initial value of a low dimensional measurement number M according to the sparsity K and a length N of the original detecting data comprises:

determining the initial value of low dimensional measurement number M according to the sparsity K and the length N of the original detecting data with a formula of $$M = \text{Floor}\left(\min\left\{K, K \log\frac{N}{K}\right\}\right)$$

where min is a function for determining a minimum value, Floor is an integer acquiring function to acquire an integer closest to the negative infinity.

12. The device according to claim 11, wherein multiplying the detecting data x(n) with a Gaussian random matrix Φ to obtain a measurement vector y(m), wherein a dimension of the Gaussian random matrix Φ is M×N, a dimension of the measurement vector is M, and M<<N, and obtaining a recovery matrix A comprises:

measuring an original data vector x(n) with a Gaussian random matrix Φ to obtain a measurement vector y(m) with a formula of $$y = \Phi x = \Phi \Psi s = As;$$

obtaining a recovery matrix A with a formula of $$A=\Phi\Psi$$

where a dimension of the recovery matrix A is M×N, and M<<N.

13. The device according to claim 8, wherein reconstructing a vector of original detecting data and calculating a reconstruction error according to the measurement vector and the recovery matrix by using a teaching-learning based optimization (TLBO) algorithm comprises:

using the TLBO to calculate a vector $s_1$ with an underdetermined equation of $$y=As_1,$$

obtaining reconstruction data $x_1$ by using the DFT with a formula of $$x_1=\Psi s_1;$$

calculating the reconstruction error E with a formula of $$E=\frac{Norm(x_1-x)}{Norm(x)}$$

where Norm is a function for calculating a 2-norm of a vector.

14. The device according to claim 13, wherein reconstructing a vector of original detecting data and calculating a reconstruction error according to the measurement vector and the recovery matrix by using a teaching-learning based optimization (TLBO) algorithm comprises:

using the TLBO to calculate a vector $s_1$ with an underdetermined equation of $$y=As_1,$$

obtaining reconstruction data $x_1$ by using the DFT with a formula of $$x_1=\Psi s_1;$$

calculating the reconstruction error E with a formula of $$E=\frac{Norm(x_1-x)}{Norm(x)}$$

where Norm is a function for calculating a 2-norm of a vector.

15. A non-transitory computer-readable storage medium having stored therein instructions that, when executed by a processor of a mobile terminal, causes the mobile terminal to perform a method for compressing and reconstructing data, the method comprising:

disposing an electromagnetic acoustic transducer (EMAT) transmitting array and an receiving EMAT array at two sides of a detecting region of a material to be detected respectively;

exciting a Lamb wave in a desired mode with a narrowband frequency $f_c$ of 125 kHz or 80 kHz by each EMAT in the transmitting EMAT array in a predetermined order, receiving the Lamb wave by the receiving EMAT array, subjecting the Lamb wave to narrowband filtering with the narrowband frequency $f_c$, to form detecting data x(n), in which n=1, 2, ... N, N is a positive integer;

analysing the detecting data with a discrete Fourier transformation (DFT) to obtain a sparse representation of original detecting data and a sparsity K thereof, determining an initial value of a low dimensional measurement number M according to the sparsity K and a length N of the original detecting data, in which K and M are positive integers;

multiplying the detecting data x(n) with a Gaussian random matrix $\Phi$ to obtain a measurement vector y(m), wherein a dimension of the Gaussian random matrix $\Phi$ is M×N, a dimension of the measurement vector is M, and M<<N, and obtaining a recovery matrix A;

reconstructing a vector of original detecting data and calculating a reconstruction error according to the measurement vector and the recovery matrix by using a teaching-learning based optimization (TLBO) algorithm;

determining whether the reconstruction error is smaller than a first predetermined value, completing the reconstruction, extracting a current measurement vector y(m) in a low dimension and sending the current measurement vector y(m) to a supervisory device if the reconstruction error is smaller than the first predetermined value;

determining whether the number of times of iteration is greater than a second predetermined value if the reconstruction error is not smaller than a predetermined value, if yes, completing the reconstruction, extracting a current measurement vector y(m) in a low dimension and sending the current measurement vector y(m) to a supervisory device, if no, increasing the measurement number M by 1 and returning to the step of measuring an original data vector x(n) with a Gaussian random matrix $\Phi$ to obtain a measurement vector y(m).

* * * * *